July 21, 1959 L. R. BATTERSBY 2,896,030
METHOD OF AUTOMATIC AMPLITUDE CONTROL FOR SPEECH FREQUENCIES
Filed May 3, 1956
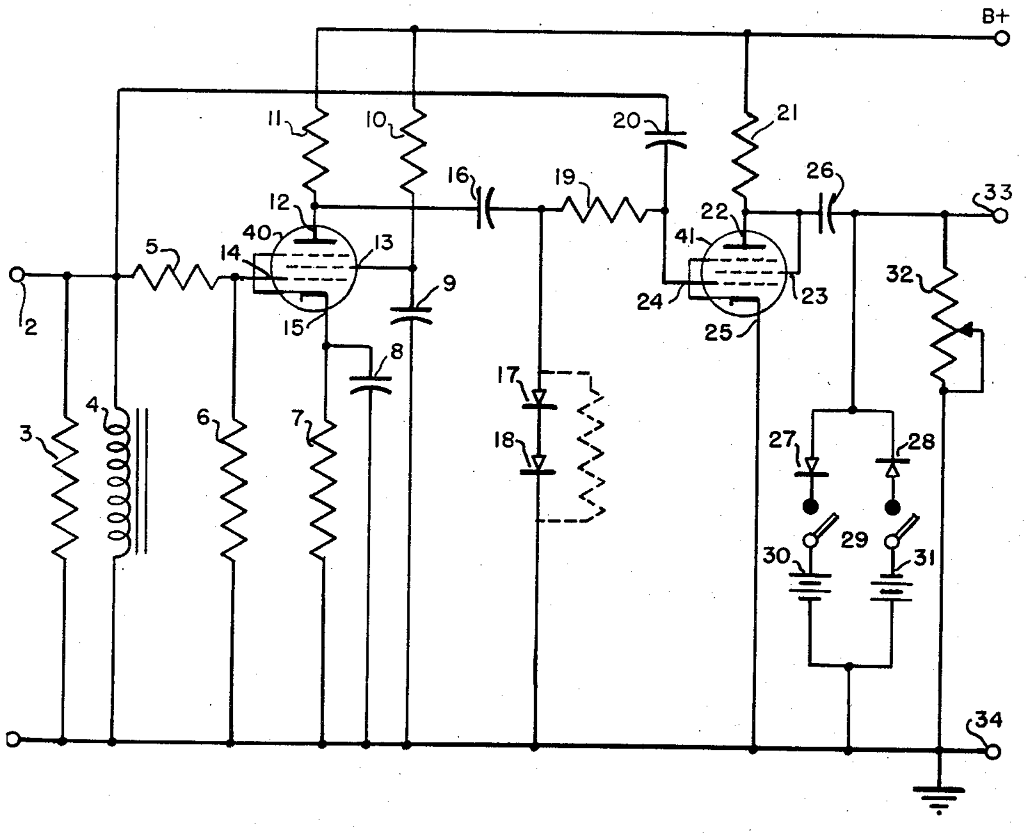
INVENTOR,
LYLE R. BATTERSBY.
BY
Harry M. Saragovitz
ATTORNEY United States Patent Office 2,896,030

Patented July 21, 1959

2,896,030

METHOD OF AUTOMATIC AMPLITUDE CONTROL FOR SPEECH FREQUENCIES

Lyle R. Battersby, Little Silver, N.J., assignor to the United States of America as represented by the Secretary of the Army Application May 3, 1956, Serial No. 582,609

1 Claim. (Cl. 179—171)

(Granted under Title 35, U.S. Code (1952), sec. 266)

The invention described herein may be manufactured and used by or for the Government for governmental purposes, without the payment of any royalty thereon.

This invention relates to amplitude control of electronic signals and more particularly to an automatic amplitude control for specific frequencies of electronic signals.

In radio communication systems it is essential that the radio frequency carrier be modulated fully in order to obtain maximum transmitter efficiency and to provide the best signal-to-noise ratio at the receiver. This is not possible with ordinary speech which contains loud as well as weak signals unless some means are provided for modifying the speech amplitude characteristics. Devices presently used for this purpose include companders, volume limiters, clippers, peak limiters, and others, used singly or in combination. The dynamic control range obtained, and the distortion introduced by such devices varies widely, as does their complexity. Such a device should preferably have small size, weight, and power drain, provide a wide dynamic control range and introduce a minimum of distortion.

It is therefore, an object of this invention to provide an improved amplitude control for a speech frequency amplifier.

It is a further object of this invention to provide an improved means for reducing the amplitude of the voltage peaks of speech frequencies in an amplifier.

It is a further object of this invention to provide an improved means for limiting the gain of an amplifier at peak voltages.

It is a further object of this invention to provide a means for limiting and clipping speech frequency waves in an amplifier to provide a substantially constant output signal of high intelligibility.

In accordance with the present invention, the speech wave is first differentiated and then applied to an automatic amplitude control circuit which preserves the speech waveform over a wide dynamic input range. Input speech variations of 35 decibels or more are thus reduced at the output to approximately 6 decibels with negligible distortion. To further reduce these output variations and to limit rapid noise peaks, the speech wave is then lightly clipped. The resultant output variations are then in the order of 1 decibel.

Basically, this method of speech amplitude control has much less distortion than that of systems which utilize clipping of 35 decibels or more in order to obtain a wide dynamic control range. In practice, it has been demonstrated that the distortion introduced by the invention herein is too small to be detected by the listener. It also provides much larger dynamic range than that obtainable with systems which utilize relatively light clipping alone to reduce the speech amplitude variations.

Other and further objects of this invention will become apparent from the following specification and the drawing, which shows a circuit diagram of the automatic amplitude control amplifier constructed according to the teachings of this invention.

For convenience, the circuit operation will be described in terms of sine wave input and it will prove helpful in following the circuit description to think of vacuum tubes 40 and 41 as separate amplifiers fed from a common source.

A sine wave applied to the input terminals 2 and 34 across a differentiating inductor 4, is applied through a voltage divider network 5 and 6 to grid 14 of an amplifier tube 40 and to grid 24 of a variable mu control tube 41 through capacitor 20.

On the positive alternation of the input cycle as grid 14 of tube 40 and grid 24 of tube 41 become less negative, an amplified negative going voltage is developed across load resistor 11 of tube 40. This voltage is applied through capacitor 16 to a voltage divider network consisting of resistor 19, capacitor 20, and resistor 3, the latter being in parallel with inductor 4 and series-connected resistors 5 and 6. The amplified negative going signal appearing at the junction of resistor 19 and capacitor 20, which would normally be applied to the grid 24 in the absence of capacitor 20, is returned to the input circuit by means of capacitor 20. As this feedback voltage is in opposition to the applied signal voltage, the signal voltage is reduced, and the dynamic range of tube 40 thus extended. Simultaneously, as noted above, the amplified signal appearing at the plate of tube 40 is effectively reduced at grid 24 of tube 41.

Diodes 17 and 18 operate only as high resistances, as indicated by the broken line symbol, during this positive alternation of the input cycle. During the negative alternation of the input cycle, which is discussed later, they provide, in conjunction with capacitors 16, a negative bias for grid 24 of tube 41 which is derived from the amplified signal of tube 40. This bias for any input amplitude is much larger than the signal voltage applied to grid 24 through capacitor 20. As a result, the change in plate current of tube 41 caused by the signal is small, and the output voltage appearing across points 33 and 34 varies only within small limits.

On the negative alternation of the input cycle, as grid 14 of tube 40 and grid 24 of tube 41 become more negative, the amplified voltage appearing across the load resistor 11 of tube 40 moves in a positive direction. When the positive going voltage exceeds the voltage on capacitor 16, the crystal diodes 17 and 18 operate as rectifiers. The current through the diodes increases the charge on capacitor 16 and thus increases the negative bias applied to grid 24 of tube 41. At the same time, the amplified signal voltage on plate 12 of tube 40 is electrically disconnected from grid 24 of tube 41, which now receives the signal voltage through capacitor 20. Because the negative input signal applied through capacitor 20 to grid 24 of tube 41 is small compared to the negative direct current bias remaining on this grid, the change in plate current of 41 is small and the output voltage appearing across points 33 and 34 again varies only within small limits.

To further reduce the output variations, crystal diodes 27 and 28 are utilized to lightly clip the positive and negative peaks of the output-wave when the contacts of switch 29 are in their closed position. The resultant output signal level then varies in the order of 1 decibel for an input level variation of 35 decibels. Diode bias batteries 30 and 31 determine the minimum level at which the diodes will conduct, and potentiometer 32 serves to adjust the output voltage to the desired clipping level.

The time constant governing the attack time in amplitude control devices operating at speech frequencies is usually a compromise between two requirements: (1) action fast enough to control the peaks; and (2) action slow enough so as not to compress later portions of speech after early portions have caused the gain reduction. In addition, the release time must be slow enough to insure quick recovery after strong signal input. The above-described amplitude control without peak clipping meets the above requirements satisfactorily in systems in which the output variations can be in the order of about 6 decibels. Such applications include sound systems and radio receivers. For transmitter application, however, where maximum modulation capability is a requirement, these variations should be reduced to a minimum. For this reason, peak clipping is provided.

In order to keep the circuitry as simple as possible, and to minimize the number of components required, no special provision has been made for balanced peak clipping. In practice it was found that crystal diodes of the type utilized are quite uniform and therefore the selection of diodes having similar characteristics is not a problem. For optimum results, however, rectifier diodes 17 and 18 and clipper diodes 27 and 28 should have a forward resistance of 100 ohms or less and back resistances in order of 400,000 ohms.

In tests conducted for the purpose of determining the effects of harmonic distortion upon the intelligibility of speech, it has been established that the low frequency vowels contain the major portion of speech power, yet contribute very little to intelligibility. The higher frequency consonants carry little power but are the principle means of conveying intelligence. It follows then that if the maximum of the intelligence in speech is to be transmitted, some means must be provided to raise the energy level of the consonants to a value comparable to or preferably above that of the vowels. This may be accomplished by filtering or more simply, by applying the speech wave to a R-C or R-L differentiating network. By differentiating the speech wave, the energy distribution is changed such that the energy in any one component is proportional to the square of the frequency and thus the energy of the consonants is increased.

From the foreging, it can be seen that speech differentiation, as used in combination with the above-described speech amplitude control, provides a very effective method of speech transmission. In addition to providing high modulation capability, a maximum of the speech intelligence is transmitted with a minimum of distortion.

In a practical embodiment of this invention, the vacuum tubes 40 and 41 are 6AH6 and 6BA6 respectively, the diodes 17, 18, 27, and 28 are CK705's, the inductor 4 is 25 millihenries, the capacitor 8 is 25 microfarads, the capacitors 9 and 16 are .1 microfarads, and capacitors 20 and 26 are .05 microfarads. In the resistances 3 is 27,000 ohms, 5 and 10 are 100,000 ohms, 6 is 12,000 ohms, 7 is 1,200 ohms, 11 is 47,000 ohms, 19 is 330,000 ohms, 21 is 7,500 ohms and 32 is 25,000 ohms.

The total power consumption of the above unit is 11 watts. Plate power input is in the order of 6.0 watts at 250 volts with no signal applied and decreases with increasing signal to 1.0 watt at maximum input levels. Plate power input at normal speech levels is approximately 3 watts.

Extensive tests to determine the degree to which voice peaks can be distorted without adversely affecting intelligibility show that 6 decibels of peak clipping is barely noticeable, 12 decibels is not objectionable, and 24 decibels of clipping can be tolerated. These tests indicate that the described method of amplitude control, normally requiring less than 6 decibels of peak clipping, should have little effect upon speech intelligibility, and this has been verified by numerous listening tests.

The effectiveness of differentiated, compressed, lightly clipped speech in the presence of noise has been demonstrated in laboratory tests. These tests have shown that the effect of noise upon intelligibility under conditions of a 6 decibel signal-to-noise ratio is negligible.

Recent field tests with handle-talkie FM radio sets show that a marked increase in received audio output power is obtained when the transmitter is equipped with with the automatic amplitude control unit described herein. On the basis of listener reports, the improvement in audio recovery due to full frequency deviation of the transmitter, appears to exceed 3 decibels.

While there has been described what is at present considered a preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

In an amplitude control system, first and second vacuum tubes, each having anode, cathode and control electrodes, a source of positive potential with respect to ground, a first load impedance connected between said source of potential and the anode of said first vacuum tube, a second load impedance connected between said source of potential and the anode of said second vacuum tube, the cathodes of said first and second vacuum tubes being connected to ground, first input terminal, a second grounded input terminal, a first resistance connected across said first and second input terminals, a first inductance across said first and second input terminals, a second resistance connecting said first input terminal to the control electrode of said first vacuum tube, a third resistance connecting the control electrode of said first vacuum tube to ground, a first condenser connected in series with a fourth resistance between the anode of said first vacuum tube and the control electrode of said second vacuum tube, a second condenser connected between the control electrode of said second vacuum tube and said first input terminal, a first output terminal and a grounded second output terminal, a third condenser connected between the anode of said second vacuum tube and said first output terminal, a first diode having one polarity, a first battery having the opposite polarity and a first switch connected in series across said first and second output terminals, a second diode having the opposite polarity, a second battery having the one polarity and a second switch connected in series across said first and second output terminals, and a third diode having the one polarity connected between the intersection of said first condenser and said fourth resistance and ground.

References Cited in the file of this patent

UNITED STATES PATENTS

| | | |
|---|---|---|
| 2,379,699 | Ford | July 3, 1945 |
| 2,406,977 | Wendt | Sept. 3, 1946 |
| 2,432,878 | Frederick et al. | Dec. 16, 1947 |
| 2,560,709 | Woodward | July 17, 1751 |
| 2,603,708 | Anger | July 15, 1952 |
| 2,610,252 | Fuller | Sept. 9, 1952 |
| 2,721,977 | Rich | Oct. 29, 1955 |
| 2,750,451 | Crow | June 12, 1956 |

OTHER REFERENCES

Terman: "Radio Engineering," McGraw-Hill Publ. Co., page 599, Fig. 6C.